US 8,225,522 B2

(12) United States Patent
Prior et al.

(10) Patent No.: US 8,225,522 B2
(45) Date of Patent: Jul. 24, 2012

(54) MEASURING DEVICE FOR DETERMINING THE SHORTEST DISTANCE BETWEEN FEATURES IN A STRUCTURE

(75) Inventors: Daniel Prior, Chester (GB); Richard Nesbitt, Chester (GB)

(73) Assignee: Airbus Operations Limited, Bristol (GB)

( * ) Notice: Subject to any disclaimer, the term of this patent is extended or adjusted under 35 U.S.C. 154(b) by 10 days.

(21) Appl. No.: 12/923,427

(22) Filed: Sep. 21, 2010

(65) Prior Publication Data
US 2011/0099829 A1 May 5, 2011

(30) Foreign Application Priority Data

Oct. 30, 2009 (GB) .................................. 0918985.3

(51) Int. Cl.
*G01B 5/14* (2006.01)
(52) U.S. Cl. ................ 33/811; 33/520; 33/613
(58) Field of Classification Search .............. 33/810, 33/464, 483, 484, 485, 486, 491, 492, 494, 33/712, 806, 809, 811, 520, 644, 679.1, 549
See application file for complete search history.

(56) References Cited

U.S. PATENT DOCUMENTS

| 3,289,307 | A | | 12/1966 | Kelly | |
|---|---|---|---|---|---|
| 4,327,493 | A | * | 5/1982 | Dickerson | 33/520 |
| 4,607,436 | A | | 8/1986 | Clay | |
| 4,682,420 | A | * | 7/1987 | Teets | 33/626 |
| 4,730,399 | A | | 3/1988 | Campbell | |
| 4,731,931 | A | * | 3/1988 | Goodman et al. | 33/796 |
| 5,103,574 | A | * | 4/1992 | Levy | 33/760 |
| 5,253,431 | A | * | 10/1993 | Smith | 33/810 |
| 5,375,339 | A | * | 12/1994 | Noel, Jr. | 33/518 |
| 5,509,208 | A | | 4/1996 | Oja | |
| 5,937,531 | A | * | 8/1999 | Menk et al. | 33/613 |
| 6,029,362 | A | * | 2/2000 | Miodragovic | 33/666 |
| 6,266,889 | B1 | * | 7/2001 | Boyce | 33/484 |
| 6,473,983 | B1 | * | 11/2002 | Gier | 33/613 |
| 2008/0196263 | A1 | | 8/2008 | Okura et al. | |
| 2008/0203235 | A1 | | 8/2008 | Sassatelli et al. | |
| 2009/0090017 | A1 | | 4/2009 | Smiroldo | |

FOREIGN PATENT DOCUMENTS

DE 26 15 015 9/1977
GB 2 285 686 7/1995

OTHER PUBLICATIONS

Search Report for GB 0918985.3 dated Nov. 16, 2009.

* cited by examiner

*Primary Examiner* — Christopher Fulton
(74) *Attorney, Agent, or Firm* — Nixon & Vanderhye P.C.

(57) ABSTRACT

A measuring device for determining the shortest distance between features in a structure.

20 Claims, 4 Drawing Sheets

MEASURING DEVICE FOR DETERMINING THE SHORTEST DISTANCE BETWEEN FEATURES IN A STRUCTURE

This application claims priority to GB Patent Application No. 0918985.3 filed 30 Oct. 2009, the entire contents of which is hereby incorporated by reference.

FIELD OF INVENTION

The present invention relates to a measuring device for determining the shortest distance between features in a structure.

BACKGROUND OF THE INVENTION

During the manufacture of complex structures, such as aircraft, dimension checks are commonly performed on a structure to ensure that it conforms to plan, taking into account manufacturing tolerances. Such dimension checks may be performed using callipers, rules or other devices to take the required measurement from the structure to compare to the corresponding plan. One problem is that such checks may need to be performed in difficult to reach or constricted spaces thus making accurate measurement difficult. For example full sight of the structural elements being measured may not be possible making accurate positioning of a calliper or rule difficult and error prone.

SUMMARY OF THE INVENTION

An embodiment of the invention provides a measuring device for determining the shortest distance between features in a structure, the measuring device comprising:
 an elongate body member having a central axis;
 a measurement scale provided on the body member parallel to the central axis for providing measurements of distance along the central axis relative to a reference line perpendicular to the central axis;
 alignment means arranged for capturing a first feature of a structure so as to centre the first feature on the reference line;
 a slide member slidably mounted on the body member for movement along the central axis;
 a reference surface provided on the slide member perpendicular to the central axis and arranged for engagement with a surface of a second feature of the structure;
 indicator means provided on the slide member and arranged to indicate the distance between the reference line and the reference surface, so that when a first feature is centred by the alignment means on the reference line and the reference surface is engaged with a surface of a second feature, the indicator means indicates on the measurement scale the perpendicular distance between the surface of the second feature and the first feature.

The alignment means may comprise an aperture in the body member arranged to fit to the first feature. The aperture may comprise a pair of surfaces converging towards the reference line, the surfaces being arranged to engage the first feature so as to centre the first feature on the reference line. The surfaces may be orientated at equal angles of convergence to the reference line. The aperture may be arranged to substantially conform to the first feature. The alignment means may comprise a protrusion arranged for capture within the first feature. The protrusion may extend in a direction perpendicular to the central axis and the reference surface. The reference surface and the indicator means may be provided by the same structural element of the slider.

A point reference surface may be provided on the slide member for providing substantially point engagement with a non-linear surface of a third feature of the structure, so that when a first feature is centred by the alignment means on the reference line and the point reference surface is engaged at a given point with a non-linear surface of a third feature, the indicator means indicates the distance on the measuring scale between the point on the non-linear surface of the third feature and the first feature.

The body member may comprise coupling means arranged to couple a rule to the body member and the measurement scale is provided by a rule coupled to the body member using the coupling means. The coupling means may be arranged to enable removal and replacement of the rule. The slide member may comprise resistance means for providing a predetermined degree of resistance to relative movement of the slide member and the body member. The alignment means may be provided by a substantially V-shaped slot in the body member, the body member being cut away behind the V-shaped slot. The rear of the V-shaped slot may form a protrusion arranged for capture within the first feature.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
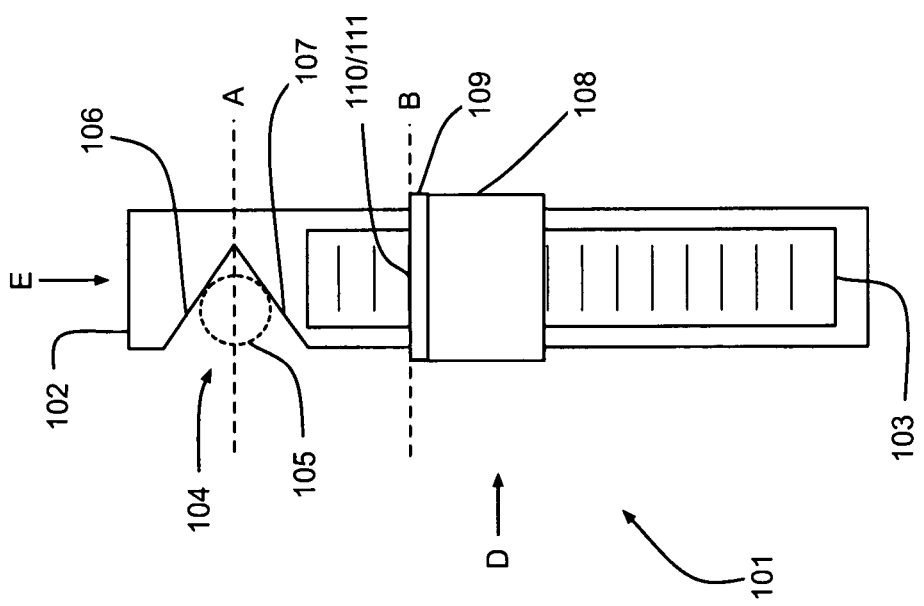
FIG. 1 is a plan view of a measuring device.

With reference to FIG. 1, a measuring device 101 comprises an elongate body member 102 and a measurement scale 103 located on the body member 102 parallel to the long central axis of the body member 102. The body member 102 further comprises alignment means 104 in the form of a V-shaped aperture formed at one end of the body member 102. The alignment means 104 is arranged to capture a feature 105, such as a bolt or rivet, when placed about the feature 105. The sides 106, 107 of the alignment means 104 are arranged to engage and centre the feature 105 on a notional reference line A perpendicular to the central axis of the body member 102. The measurement scale 103 is arranged to indicate measurements relative to the reference line A. In other words, the measurement scale 103 is zeroed on the reference line A. In the present embodiment, the sides 106, 107 of the alignment means 104 are orientated at equal angles relative to the reference line A so that features 105 of substantially the same cross sectional profile and within a predetermined range of sizes are all automatically centred on the reference line A when captured within the aperture of the alignment means 104. For example, a set of features, in the form of rivets, having a range of circular cross-sections, would each be centred automatically on the reference line A.

The measuring device 101 further comprises a slide member 108 in the form of a collar mounted around the body member 102 and arranged to slide along the body member 102 over the measurement scale 103. The slide member 108 comprises a reference edge 109 in the form of a lip raised outwardly from the front face of the slide member 108 adjacent its edge facing the alignment means 104. The reference edge 109 is arranged to provide a reference surface 110 orientated parallel and perpendicular to the reference line A. The slide member 108 further comprises indicator means 111, which in the present embodiment, is provided by the reference surface 110. The indicator means 111 is arranged to provide an indication of a measurement B on the measurement scale 103 which is the shortest or perpendicular distance between the reference line A and the reference surface 110. Thus, when a first structural feature, such as a rivet, is captured within the alignment means 104 and the reference surface 110 is positioned against a linear surface of a second structural feature, such as a girder edge, the indicator means 111 indicates the perpendicular distance on the measuring scale 103 between the surface of the second feature and the centre of the first feature.

Figure 2:
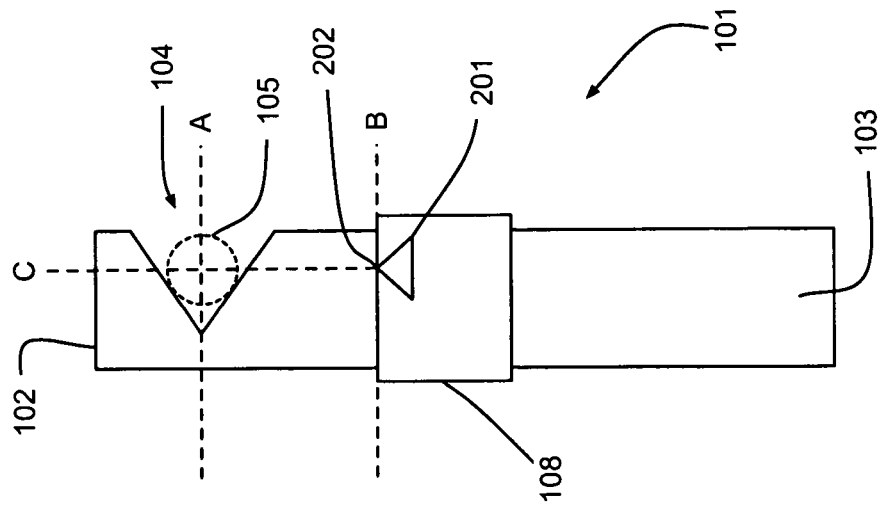
FIG. 2 is a plan view of the opposite side of the measuring device of FIG. 1.

FIG. 1 shows the front face of the measuring device 101. With reference to FIG. 2, on the back face of the measuring device 101, the slide means 108 is provided with a further reference means 201 in the form of a triangular sectioned protrusion extending perpendicularly from the back face of the slide means 108. A lead edge 202 of the reference means 201 is orientated towards the reference line A and aligned with the indicator means 111 on the opposite side of the slide means 108. The lead edge 202 is arranged to provide substantially point contact with the surface of a structural feature. In the present embodiment, the reference means 201 is positioned so as to align the lead edge 202 with a further reference line C running through the centre of the first structural feature 105 perpendicular to the reference line A. The position of the reference line C is selected to conform to the actual or average centre of the first feature 105. Thus, when a first structural feature, such as a rivet, is captured within the alignment means 104 and the lead edge 202 is positioned against a non-linear surface of a third structural feature, such as a curved girder edge, the indicator means 111 indicates the perpendicular distance on the measuring scale 103 between the contact point of the lead edge 202 on the curved surface of the third feature and the centre of the first feature.

Figure 3:
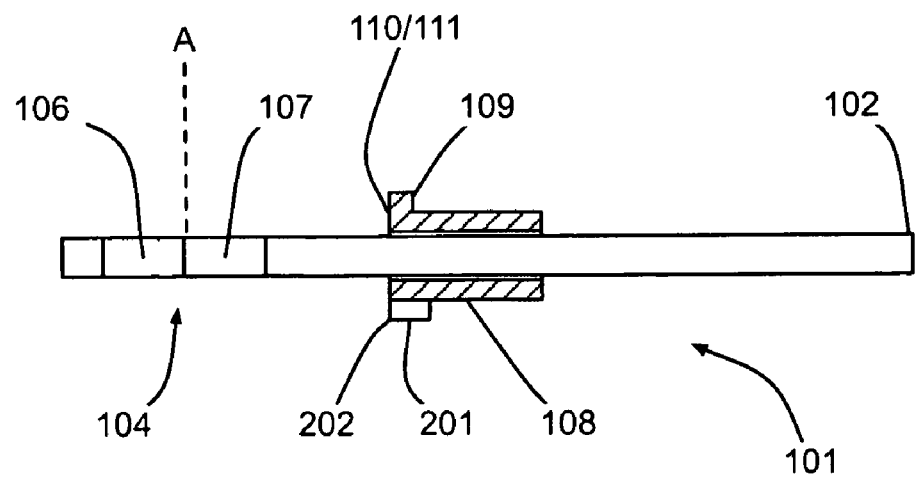
FIG. 3 is a cross-sectional side view of the measuring device of FIG. 1.
Figure 4:
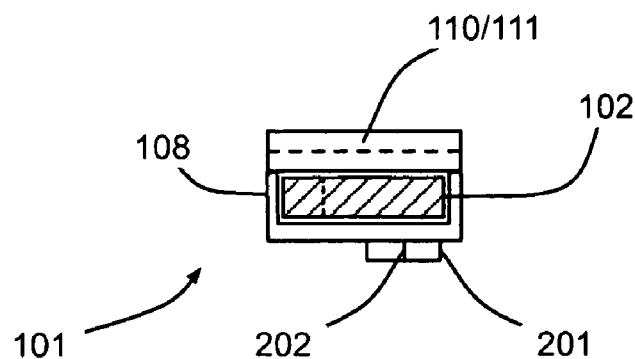
FIG. 4 is a cross-sectional end view of the measuring device of FIG. 1.

FIG. 3 is a cross-sectional side view in the direction D of the measuring device 101 of FIG. 1 showing the reference surface 110 and lead edge 202 of the alignment means 201 both aligned with the indicator edge 111 for indicating measurements relative to the reference line A. FIG. 4 is a cross-sectional end view in the direction E of the measuring device 101 of FIG. 1 showing the body member 102 captured within the slide means 108. In addition, the reference surface 110 parallel and perpendicular to the reference line A and the off-centre lead edge 202 of the alignment means 201 are also shown.

Figure 5:
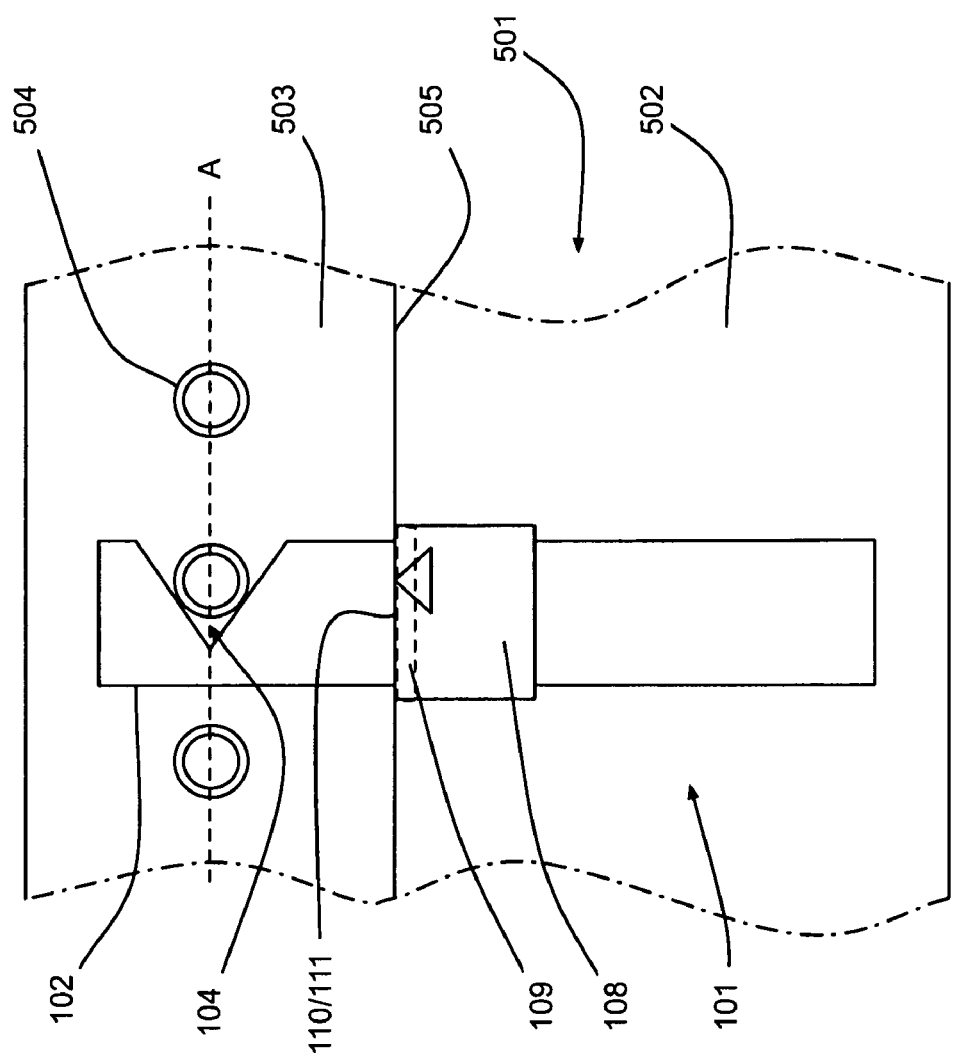
FIG. 5 is a plan view of the measuring device of FIG. 1 in use, measuring the perpendicular distance between two structural features in the form of a rivet and a linear stringer edge.

With reference to FIG. 5, the measuring device 101 is shown in use in a section of a first aircraft wing panel 501. The first aircraft wing panel 501 comprises a wing cover 502 to which a linear stringer 503 has been fixed using rivets 504. The linear stringer 503 comprises a linear edge 505 and, in the present example, the shortest distance between the linear stringer edge 505 and the centre of the rivet 504 is monitored to ensure that the first wing panel 501 is within predetermined manufacturing tolerances. In order to measure the shortest distance between the linear stringer edge 505 and the centre of a rivet 504, the alignment means 104 is placed about the rivet 504 and the slide means 108 moved to bring the reference surface 110 into contact with the linear stringer edge 505. With the alignment means 104 and slide means 108 biased into these positions by the operator, the rivet 504 is centred on the reference line A and the reference surface 110 held against the linear stringer edge 505. Thus the indicator means 111 is positioned over the measuring scale 103 so as to indicate the shortest distance between the centre of the rivet 504 and the linear stringer edge 505.

Figure 6:
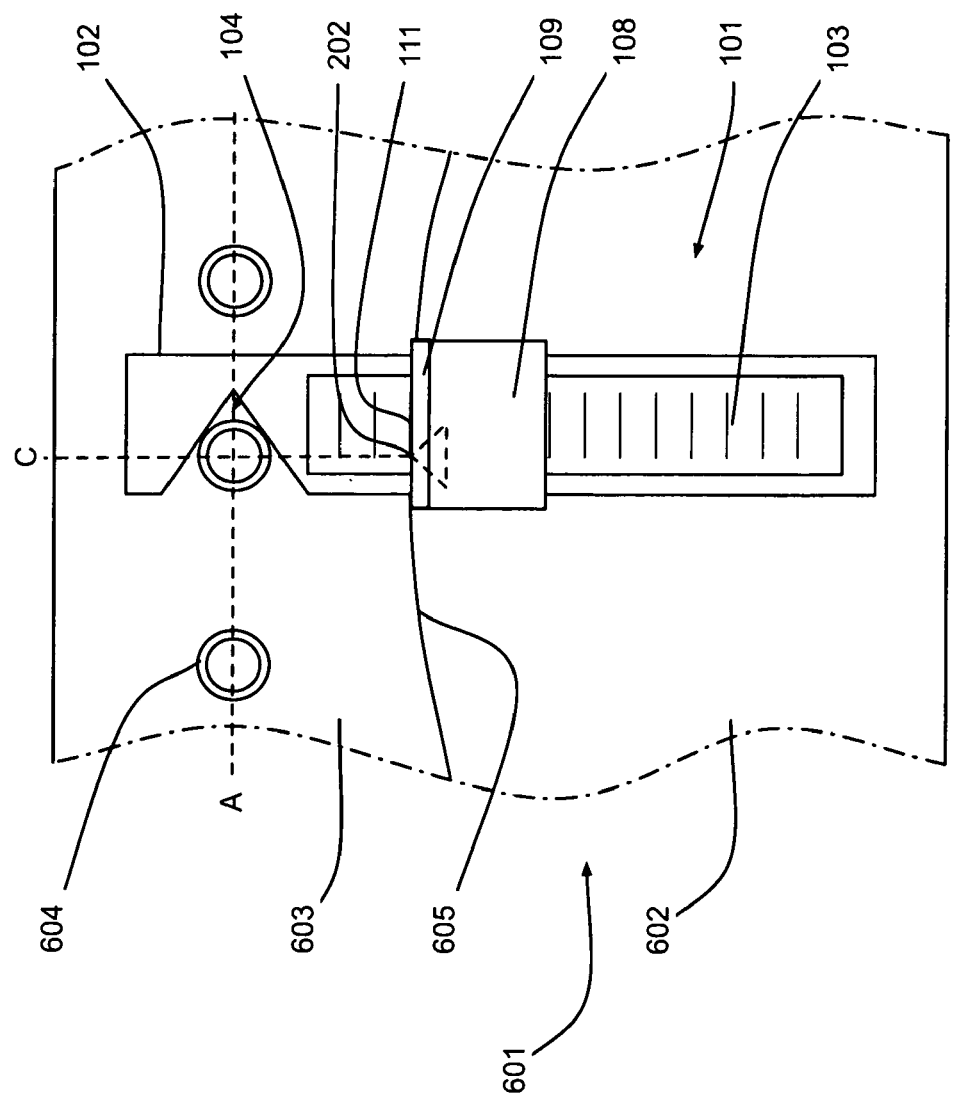
FIG. 6 is a plan view of the measuring device of FIG. 1 in use, measuring the perpendicular distance between two structural features in the form of a rivet and a curved stringer edge.

With reference to FIG. 6, the measuring device 101 is shown in use in a section of a second aircraft wing panel 601. The second aircraft wing panel 601 comprises a wing cover 602 to which a curved stringer 603 has been fixed using rivets 604. The curved stringer 603 comprises a curved edge 605 and, in the present example, the shortest distance between the curved stringer edge 605 and the centre of the rivet 604 is monitored to ensure that the second wing panel 601 is within predetermined manufacturing tolerances. In order to measure the shortest distance between the curved stringer edge 605 and the centre of a rivet 604, the alignment means 104 is placed around the rivet 604 and the slide means 108 moved to bring the lead edge 202 of the alignment means 201 into contact with the curved stringer edge 605. With the alignment means 104 and slide means 108 biased into these positions by the operator, the rivet 604 is centred on the reference line A and the lead edge 202 is held against the curved stringer edge 605. Furthermore, the biasing of the alignment means 104 and slide means 108 enables the lead edge 202 to slide along the curved stringer edge 605 towards its closest position to the centre of the rivet 604. Thus the indicator means 111 is positioned over the measuring scale 103 so as to indicate the shortest distance between the centre of the rivet 604 and the curved stringer edge 605.

As will be understood by those skilled in the art, the alignment means may be adapted from the V-shaped slot described above so as to be self-centering on other, non-circular profiles. For example, the sides of the alignment means may be arranged at different angles and one or both of them may be convex or concave. The alignment means may be provided by an open or closed aperture arranged to substantially conform to the cross-section of a given structural feature. The alignment means may be provided by a set of protrusions arranged to act together to capture a given structural feature.

In another embodiment, the alignment means is arranged itself to be captured within a structure feature. For example, the alignment means is provided by a triangular protrusion from one side of the body member arranged itself to be captured within a structural feature in the form of a hole. In a further embodiment, the triangular protrusion is provided adjacent the triangular aperture, described above with reference to FIG. 1, and similarly aligned on the line A. The triangular protrusion adjacent the triangular aperture together thus form and angled arm arranged on one side to capture and centre a structural feature, such as a rivet, and on the other side to be captured and thus centre on a structural feature, such as a hole. Such an arrangement also provides an alignment means capable of operating on structural features in constricted spaces. As will be understood by those skilled in the art, the body member or alignment means may be formed or adapted so as to fit within any applicable constricted space such as the space between two structural features so as to enable a measurement to be based on one of the structural features. For example, as shown in FIGS. 5 & 6, the body member or alignment means are formed or adapted so as to fit between two rivets.

As will be understood by those skilled in the art, the lead edge of the reference means may be provided by any suitable structure for providing substantially point contact with the surface of a curved structural feature and also capable of sliding along the curved surface to the point at which the shortest distance between the two relevant features may be measured.

In another embodiment, measuring scales are provided on both sides of the body member. In a further embodiment, the body member is provided with fixing means for fixing a measuring scale, such as a rule, to the body member. The fixing means may be arranged to allow the rule to be permanently or removably fixed to the body member. The fixing means may be arranged to accept a range of one or more commonly available or standard sized rules. Such fixing means may be provided on both sides of the body member.

In another embodiment, the slide means may be provided with means for providing a predetermined resistance to its sliding movement on the body member so that, once a measurement has been taken from a structure, the measuring device is transportable while the taken measurement is maintained. For example, a spring may be provided between the slide means and the body member to bias the slide means and body member into contact with each other and thus provide the required resistance. Alternatively a ratchet or threaded arrangement may be employed to perform a comparable function.

As will be understood by those skilled in the art, the body member and slide means may be formed from any suitable material. For example, the body member may be formed from aluminium and the slider from clear polycarbonate so as not to obscure the measuring scale. The measuring scale may be applied directly to the body member by etching or a suitable printing process. The measuring scale may be provided as a printed label attached directly to the body member.

In another embodiment, the indicator means is provided by separate means from the reference surface thus enabling the indicator means to be positioned elsewhere on the slide means. For example, where the slide means is transparent, the indicator means may be provided by an etched or printed line on the body of the slide means over the measuring scale.

Embodiments of the invention provide a measuring device having alignment means arranged to automatically and repeatably centre on a given structural feature. The alignment means may be arranged to centre on a predetermined range of structural features. The positive location of the measuring device on structural features enables the measuring device to be used for measuring structural elements that may be obscured from direct view or positioned within constricted spaces. The measurements taken by the measuring device may be transported from measuring site. The measuring device is of a relatively simple and inexpensive construction.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A measuring device for determining the shortest distance between features in a structure, said measuring device comprising:
   an elongate body member having a central axis;
   a measurement scale provided on said body member parallel to said central axis for providing measurements of distance along said central axis relative to a reference line perpendicular to said central axis;
   alignment means for capturing a first feature of a structure so as to centre said first feature on said reference line;
   a slide member slidably mounted on said body member for movement along said central axis;
   a reference surface provided on said slide member perpendicular to said central axis and arranged for engagement with a surface of a second feature of said structure; and
   indicator means provided on said slide member for indicating the distance between said reference line and said reference surface, so that when said first feature is centered by said alignment means on said reference line and said reference surface is engaged with said surface of a second feature, said indicator means indicates on said measurement scale the perpendicular distance between said surface of said second feature and said first feature.

2. A measuring device according to claim 1 in which said alignment means comprises an aperture in said body member arranged to fit to said first feature.

3. A measuring device according to claim 2 in which said aperture comprises a pair of surfaces converging towards said reference line, said surfaces being arranged to engage said first feature so as to centre said first feature on said reference line.

4. A measuring device according to claim 3 in which said surfaces are orientated at equal angles of convergence to said reference line.

5. A measuring device according to claim 2 in which said aperture is arranged to substantially conform to said first feature.

6. A measuring device according to claim 1 in which said reference surface and said indicator means are provided by the same structural element of said slider.

7. A measuring device according to claim 1 in which a point reference surface is provided on said slide member for providing substantially point engagement with a non-linear surface of a third feature of said structure, so that when a first feature is centered by said alignment means on said reference line and said point reference surface is engaged at a given point with a non-linear surface of a third feature, said indicator means indicates the distance on said measuring scale between said point on said non-linear surface of said third feature and said first feature.

8. A measuring device according to claim 1 in which said body member comprises coupling means for coupling a rule to said body member and said measurement scale is provided by a rule coupled to said body member using said coupling means.

9. A measuring device according to claim 8 in which said coupling means is for enabling removal and replacement of said rule.

10. A measuring device according to claim 1 in which said slide member comprises resistance means for providing a predetermined degree of resistance to relative movement of said slide member and said body member.

11. A measuring device according to claim 1 in which said body member comprises coupling means for coupling a rule to said body member and said measurement scale is provided by a rule coupled to said body member using said coupling means.

12. A measuring device according to claim 11 in which said coupling means is for enabling removal and replacement of said rule.

13. A measuring device for determining the shortest distance between features in a structure, said measuring device comprising:
an elongate body member having a central axis;
a measurement scale provided on said body member parallel to said central axis for providing measurements of distance along said central axis relative to a reference line perpendicular to said central axis;
alignment means, fixed to said body member, for capturing a first feature of a structure so as to center said first feature on said reference line;
a slide member slidably mounted on said body member for movement along said central axis;
a linear reference surface provided on said slide member perpendicular to said central axis and parallel to said reference line and arranged for engagement with a linear surface of a second feature of said structure; and
indicator means provided on said slide member for indicating the distance between said reference line and said linear reference surface, so that when said first feature is centered by said alignment means on said reference line and said linear reference surface is engaged with said linear surface of a second feature, said indicator means indicates on said measurement scale the perpendicular distance between said linear surface of said second feature and said center of said first feature.

14. A measuring device according to claim 13 in which said alignment means comprises an aperture in said body member arranged to fit to said first feature.

15. A measuring device according to claim 14 in which said aperture comprises a pair of surfaces converging towards said reference line, said surfaces being arranged to engage said first feature so as to centre said first feature on said reference line.

16. A measuring device according to claim 15 in which said surfaces are orientated at equal angles of convergence to said reference line.

17. A measuring device according to claim 14 in which said aperture is arranged to substantially conform to said first feature.

18. A measuring device according to claim 13 in which said reference surface and said indicator means are provided by the same structural element of said slider.

19. A measuring device according to claim 13 in which a point reference surface is provided on said slide member for providing substantially point engagement with a non-linear surface of a third feature of said structure, so that when a first feature is centered by said alignment means on said reference line and said point reference surface is engaged at a given point with a non-linear surface of a third feature, said indicator means indicates the distance on said measuring scale between said point on said non-linear surface of said third feature and said first feature.

20. A measuring device according to claim 13 in which said slide member comprises resistance means for providing a predetermined degree of resistance to relative movement of said slide member and said body member.

* * * * *